July 15, 1969  A. G. DOMPKOWSKI  3,455,672
APPARATUS FOR SHAPING AND TEMPERING GLASS SHEETS WITH MEANS
TO TRANSPORT THE SHEETS THEREBETWEEN
Filed Nov. 28, 1966  5 Sheets-Sheet 1
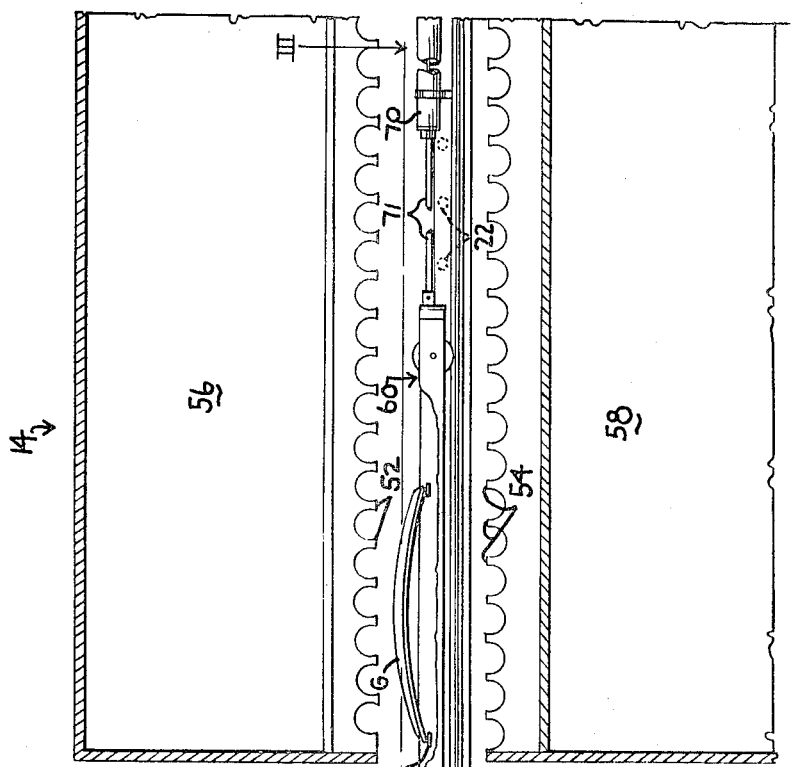
FIG. 1
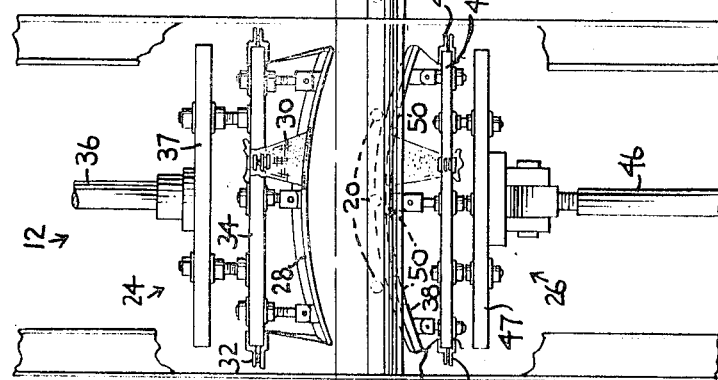
INVENTOR
ALEX G. DOMPKOWSKI
ATTORNEYS July 15, 1969 A. G. DOMPKOWSKI 3,455,672
APPARATUS FOR SHAPING AND TEMPERING GLASS SHEETS WITH MEANS
TO TRANSPORT THE SHEETS THEREBETWEEN
Filed Nov. 28, 1966 5 Sheets-Sheet 2

INVENTOR
ALEX G. DOMPKOWSKI

ATTORNEYS

INVENTOR
ALEX G. DOMPKOWSKI

ATTORNEYS

INVENTOR
ALEX G. DOMPKOWSKI
BY
Chisholm and Spencer
ATTORNEYS

INVENTOR
ALEX G. DOMPKOWSKI

BY Chisholm and Spencer
ATTORNEYS

United States Patent Office 3,455,672
Patented July 15, 1969

3,455,672
APPARATUS FOR SHAPING AND TEMPERING GLASS SHEETS WITH MEANS TO TRANSPORT THE SHEETS THEREBETWEEN
Alex G. Dompkowski, Mansfield, Ohio, assignor to PPG Industries, Inc., Pittsburgh, Pa., a corporation of Pennsylvania
Filed Nov. 28, 1966, Ser. No. 597,274
Int. Cl. C03b 23/02
U.S. Cl. 65—273                          7 Claims

ABSTRACT OF THE DISCLOSURE

Transporting deformable glass sheets from a shaping station to a quenching station using a reciprocating transfer carriage provided with moving fingers that are retracted to provide clearance for a glass sheet to enter the shaping station and be engaged by shaping molds. The fingers extend to receive the bent glass for transfer with the carriage to the quenching station and retract to deposit the glass at the quenching station.

---

Many glass sheet articles such as face plates for television tubes are shaped by pressurized engagement between a pair of shaping members having complementary glass shaping surfaces conforming to the shape desired for the opposite surfaces of the shaped glass sheets. It has been found to be especially efficient to press bend glass sheets suitable for use as television tubes having rectangular outlines and shaped about both major and minor axes at uniform rates of curvature by conveying a series of glass sheets along a horizontally disposed roller conveyor extending in a horizontal direction through a tunnel type furnace, a shaping station and a quenching station.

The glass sheets are moved in series through the furnace where they are heated in sequence to a temperature sufficiently high for deformation, which is upwards of 1080 degrees Fahrenheit for commercial plate, sheet or float glass of soda-lime-silica composition. Then the heated glass sheets are transported rapidly to the shaping station at a sufficiently high temperature for deformation and are stopped between upper and lower shaping members. The lower shaping member is normally disposed in a retracted position below the plane of the roller conveyor and when the glass sheet occupies a position intermediate the upper and lower shaping members, the lower member is moved upward through the plane occupied by the roller conveyor to press the glass sheet into a shape conforming to that of the shaping surfaces of the upper and lower glass shaping members. The lower shaping member is then moved downward into retracted position and the heated, bent glass sheet is transported on the roller conveyor from the shaping station to the quenching station where the glass sheet is rapidly cooled to heat-strengthen or toughen the glass.

Before the present invention, the still hot, bent glass sheets were distorted during their transfer from the pressing station to the quench, particularly relatively thin glass sheets of ⅛-inch nominal thickness, unless the holding time for the glass sheets in the press was extended to 11 seconds or more. Such an extended holding time permitted sufficient heat exchange between the hot glass and the shaping members to harden the glass surfaces sufficiently for the glass to retain its shape during its transport to the quenching station. However, this technique reduced the output of the pressing apparatus at a time when the demand for color television tubes was so great that it became necessary to consider the building of additional fabrication equipment. This reduced output resulted from the need to permit additional time for the shaping members to cool sufficiently to compensate for the greater heat build-up in the shaping members resulting from their more prolonged contact with the successive deformable glass sheets, particularly when operations continued for several hours without any shutdown for replacing covers or for some other reason causing a shutdown.

The present invention makes it possible to increase the output of the press bending and tempering apparatus while substantially eliminating deviation from the design curvature of the television face plates resulting from transporting the shaped glass from the press to the quench immediately after its shaping. This is accomplished in the present invention by transporting the glass sheets on movable fingers that support the relatively hot bent glass sheets from the shaping station to the quenching station with no relative movement between the fingers and the glass while the glass is at a temperature sufficiently hot to be deformable by intermittent bumping on spaced rollers as in the prior art. A typical example of prior art apparatus that requires a prolonged holding time for the glass shaping members is Belgian Patent No. 672,514.

The present invention provides a transfer carriage and means operatively connected to the transfer carriage for moving the carriage longitudinally along a path between a first carriage position at a shaping station and a second carriage position at a quenching station. The shaping station comprises a pair of shaping members having complementary surfaces conforming to the shape desired for the bent glass and includes a first shaping member or mold located to one side of the path and a second shaping member notched for movement between a first retracted mold position on the other side of the path to provide clearance for a heat-softened glass sheet to enter or leave the shaping station and a second glass engaging mold position on said one side of said path to sandwich the glass sheet in pressurized engagement between the shaping members to shape the glass sheet. Fingers are disposed on said carriage between said first mold and said path, means are provided for extending and retracting the fingers at an angle to the path and to the direction of movement for the movable shaping member. Notches are provided on the movable shaping member in alignment with the fingers when the latter are extended in the first carriage position.

The notches in the second shaping member are aligned with the extended fingers when the carriage occupies the first carriage position to permit the fingers to receive a bent glass sheet when the second shaping member moves from its glass engaging position to its mold retracted position after having shaped the glass sheet at the shaping station.

In order to understand the present invention, a description of an illustrative embodiment including a series of drawings is provided. In the drawings, wherein like reference numbers refer to like structural elements:

FIG. 1 is a fragmentary, longitudinal sectional view of a horizontal press bending apparatus incorporating a carriage transfer of the type illustrating the present invention;

Figure 2:
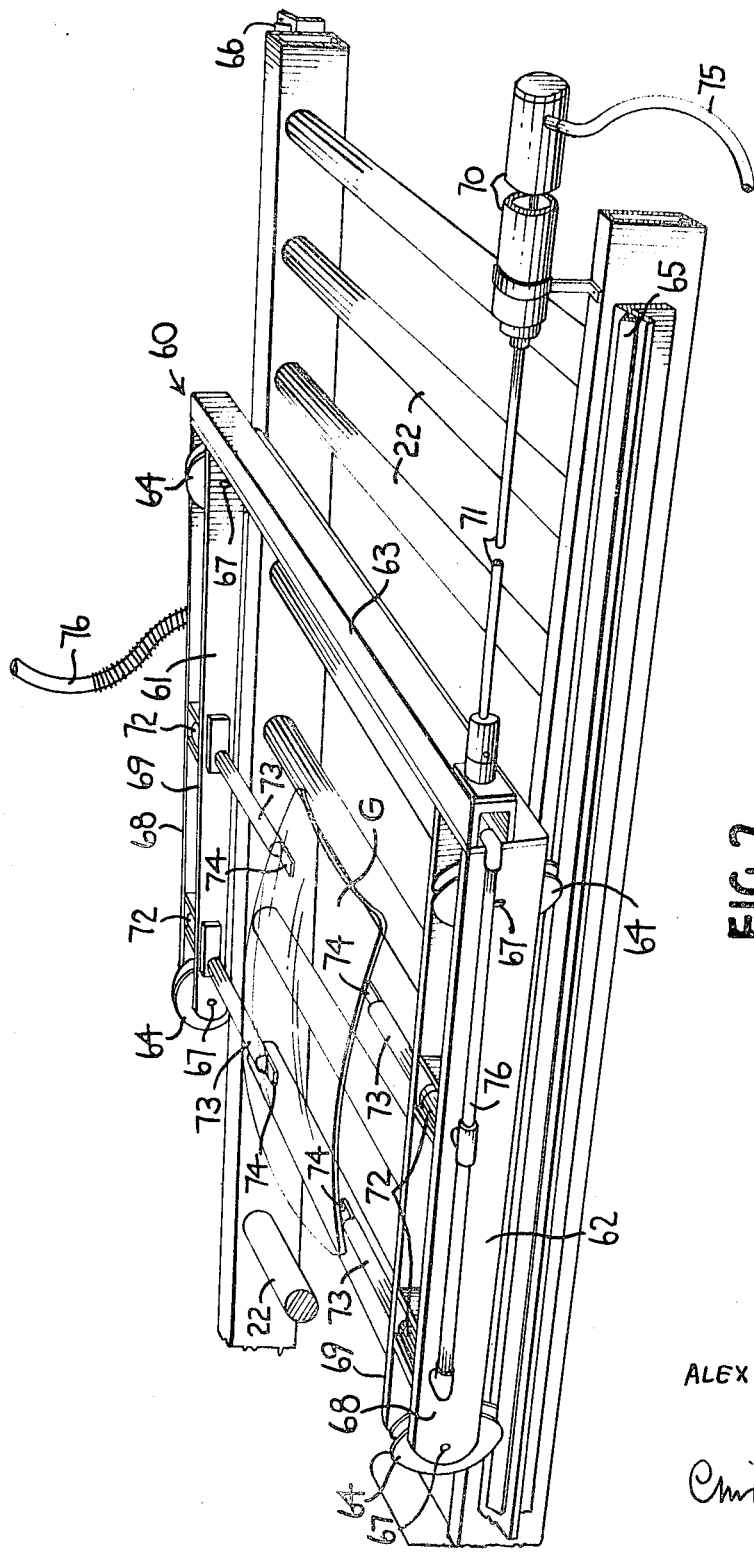
FIG. 2 is a perspective view of the carriage and a portion of the conveyor on which the carriage is supported showing the relationship of the carriage to the conveyor.
Figure 3:
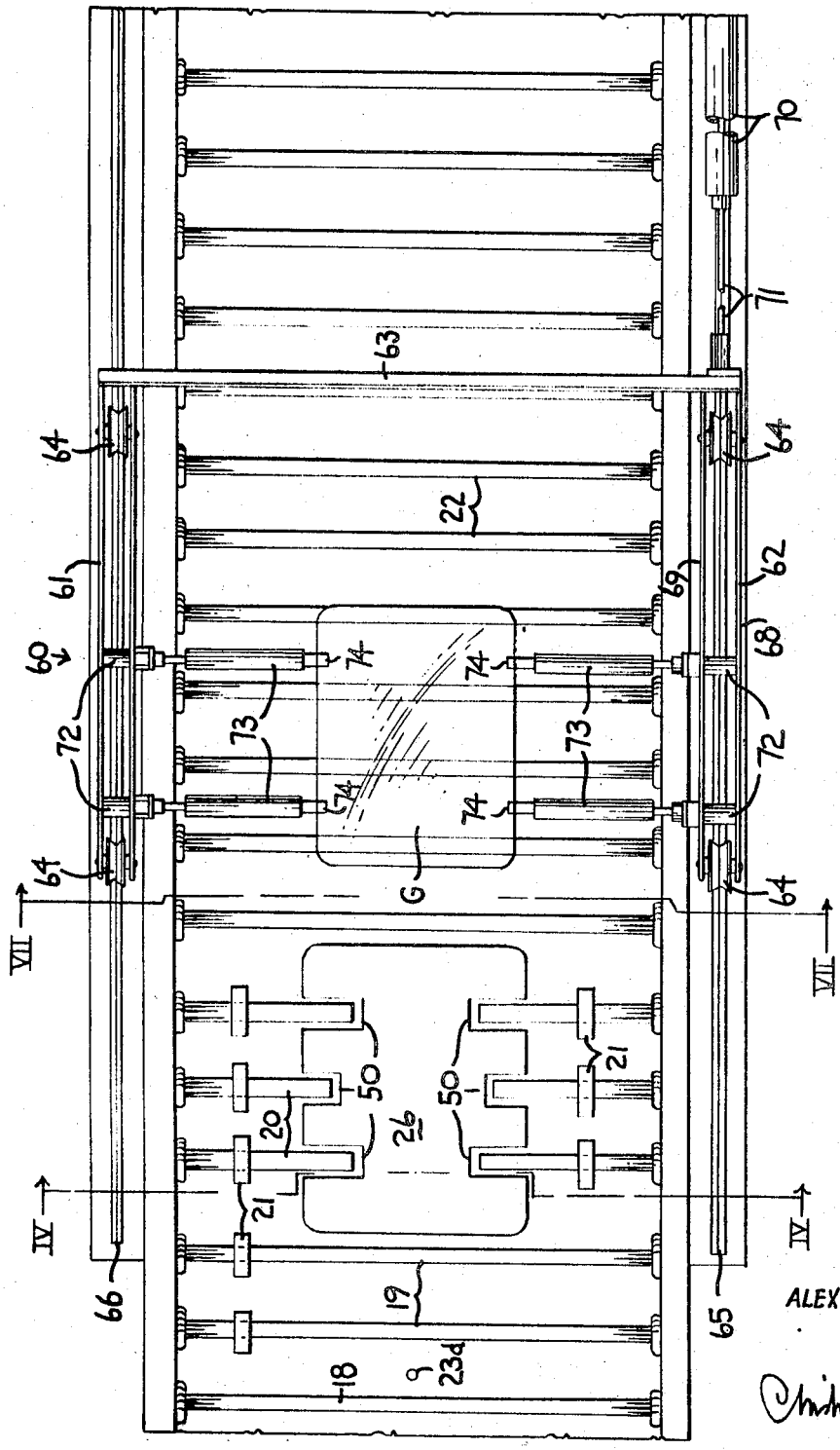
FIG. 3 is a horizontal sectional view taken along the lines III—III of FIG. 1.
Figure 4:
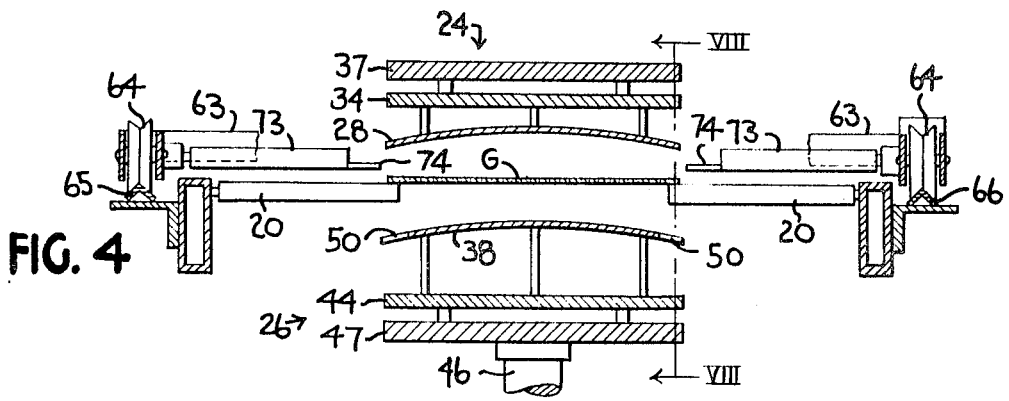
Figure 5:
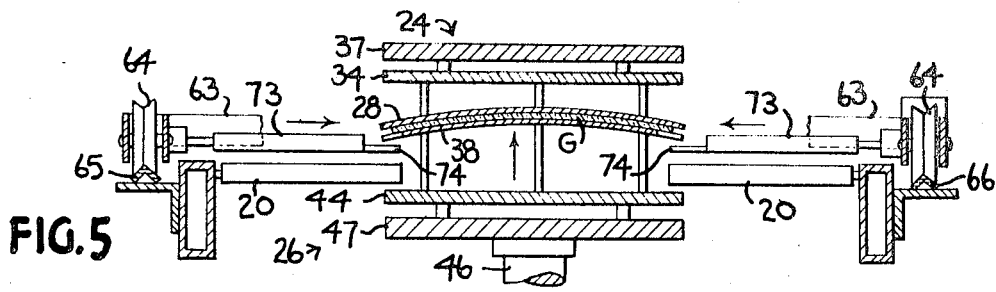
Figure 6:
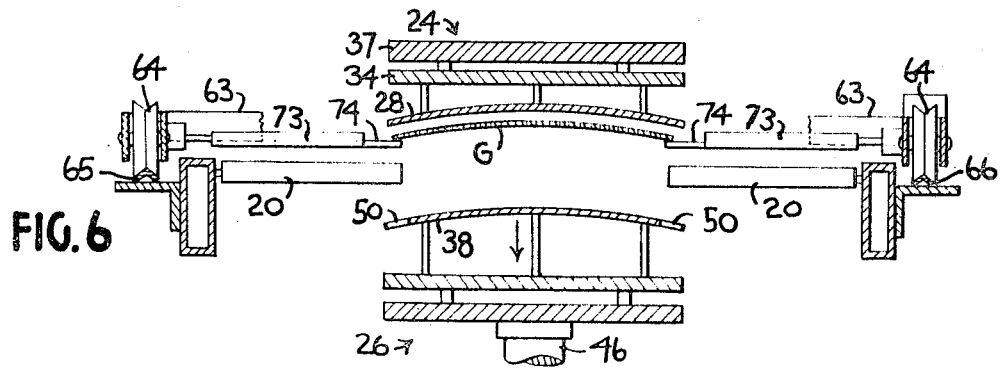
Figure 7:
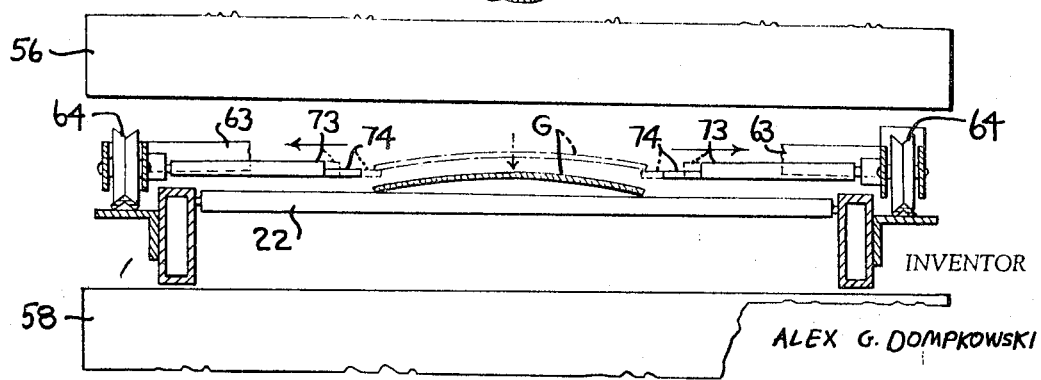
Figure 8:
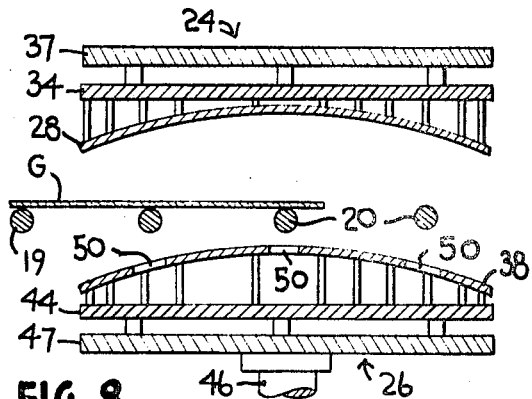
Figure 12:
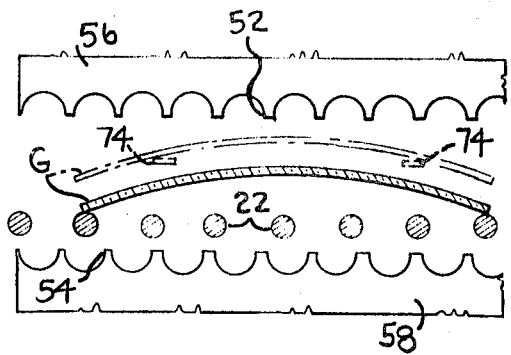
Figure 9:
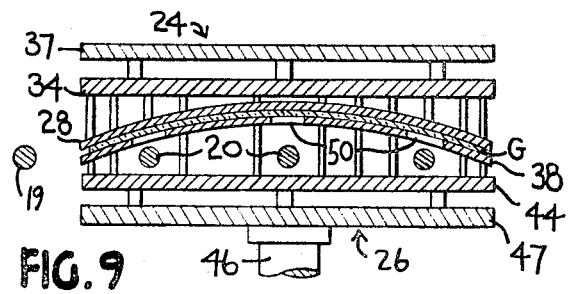
Figure 10:
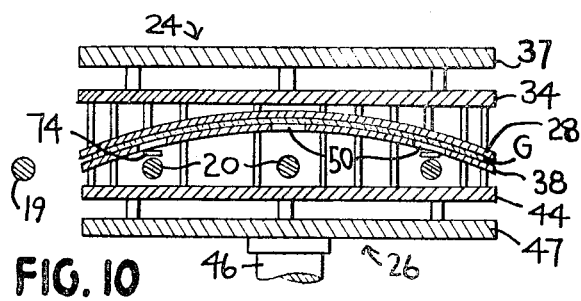
Figure 11:
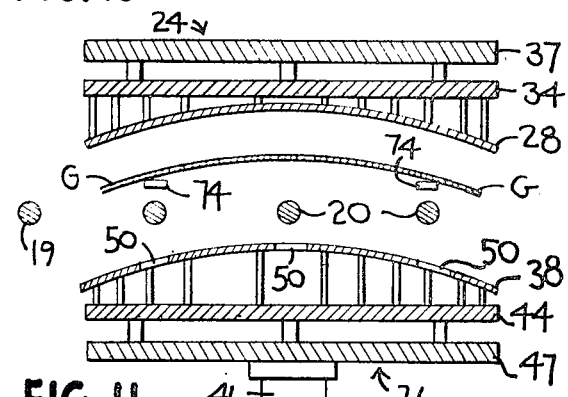
Figure 13:
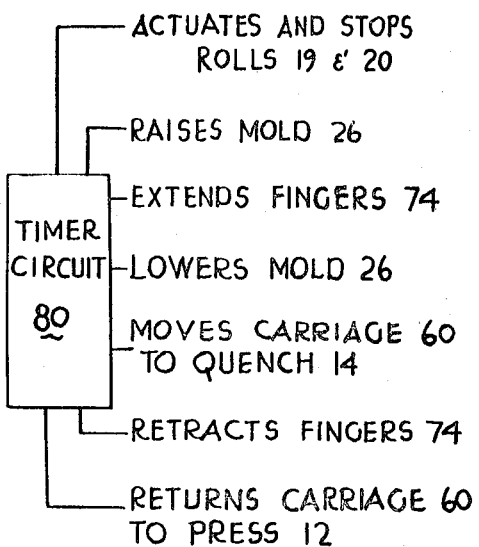

FIGS. 4 to 6 are schematic sectional views taken along the lines IV—IV of FIG. 3 of various stages of a shaping and transfer cycle, with FIG. 4 showing a glass sheet arriving in a heat-softened state at the glass shaping station, FIG. 5 showing the glass sheet undergoing shaping by pressurized engagement and FIG. 6 showing the shaped glass sheet supported on the fingers of the transfer carriage with the shaping members retracted;

FIG. 7 is a transverse section taken along the lines VII—VII of FIG. 3 showing the glass sheet in phantom supported on the fingers as it enters the quenching station and in solid lines supported on the conveyor rolls as the glass undergoes quenching;

FIGS. 8 through 11 are schematic, longitudinal sectional views of the glass shaping station transverse to the views of FIGS. 4 to 6 at different stages of the cycle with FIG. 8 showing a glass sheet entering the shaping station, FIG. 9 showing a glass sheet being shaped by pressurized engagement between the upper and lower shaping members, FIG. 10 showing the fingers extended into position below notches in the lower shaping member to receive the bent glass sheet for transfer, and FIG. 11 showing the bent glass sheet deposited on the fingers with the shaping members retracted to permit the bent glass sheet to leave the shaping station;

FIG. 12 is a view at right angles to that of FIG. 7 showing in phantom a bent glass sheet supported on fingers arriving at the quenching station and showing in solid lines the bent glass sheet deposited on the conveyor after the fingers are retracted; and FIG. 13 is a chart of successive steps of a bending and transfer cycle initiated by a glass detection device.

Referring to the drawings, a roller conveyor 10 comprising a plurality of longitudinally spaced rolls is shown extending through a furnace 11, a shaping station 12 and a quenching station 14. In the furnace 11, heaters 16 and 17 are disposed above and below the conveyor 10 to irradiate sheets conveyed therealong in a manner well known in the art.

The roller conveyor comprises a plurality of continuous rolls 18 spaced longitudinally of one another along the length of the furnace 11, an intermediate section of continuous rolls 19 and stub rolls 20 selectively engaged by clutches 21, and additional rolls 22 that are spaced longitudinally along the length of the quenching station 14. A motor (not shown) drives rolls 18 and 22 at a selected speed, while an additional motor (also not shown) selectively drives the rolls 19 and 20 intermittently at a high speed when engaged by clutches 21 as is well known in the art. A glass sensing device comprising a source 23s of radiant energy disposed to one side of the conveyor 10 and a detector 23d, such as a photomultiplier tube, on the other side of the conveyor actuates a timer circuit 80 that controls the time the clutches 21 engage the high speed rolls 19 and 20 and the sequence of steps in the bending and transfer cycle in a manner well known in the art when a glass sheet reaches detector 23d.

The rolls 18, 19 and 20 all lie in a common plane so that flat glass sheets may be transported through the furnace and into the shaping station without excessive bumping. The rolls 22 in the quenching station are in the same common plane as rolls 18, 19 and 20 because the illustrative embodiment of the present invention represents a modification of pre-existing roller conveyor apparatus having all the rolls lying in a common plane. The detailed structure of the conveyor is described for illustration only. It will be apparent that the present transfer apparatus may be used with shaping apparatus employing any form of conveyor including the fluid or gaseous support type, and conveyors using a combination of fluid support and roller support as well as the roller conveyor illustrated.

The roller conveyor 10 of the illustrative embodiment conveys a succession of glass sheets through the furnace 11 where the glass sheets are heated to deformation temperature, and then are transferred rapidly via rolls 19 to the stub rolls 20 at the shaping station 12. The stub rolls 20 are located intermediate a first or upper shaping member 24 and a second or lower shaping member 26.

The upper shaping member 24 comprises a shaping plate 28 having a downwardly facing shaping surface that is recessed in elevation. A cover 30 for the shaping plate 28 is composed of a fiber glass cloth fabric that does not harm the major surfaces of the flat glass sheet when it comes into engagement thereagainst. A series of clamps 32 secure the cover 30 in stretched or unwrinkled condition over the shaping plate 28. The clamps 32 secure the ends of the cover 30 to the periphery of a backing plate 34. The latter is secured in spaced relation behind the shaping plate 28.

The lower shaping member 26 comprises a shaping plate 38 that has a protruding portion facing upward to match the curvature of shaping plate 28. A cover 40 similar to cover 30 is secured by clamps 42 to the periphery of a backing plate 44 in unwrinkled condition. Backing plate 44 is similar to backing plate 34 and attached to shaping plate 38 in a manner similar to the manner of attaching plate 34 to shaping plate 28 of the upper shaping member 24.

The upper shaping member 24 may be movable by means of a piston 36 attached to a piston plate 37 or may be supported in freely suspended position by stops (not shown) above a given horizontal plane and spring loaded to resist upward movement instead of being moved by the piston 36 as is well known in the art. The piston plate 37 is secured in spaced relation to the rear of the backing plate 34.

The lower shaping member 26 is vertically movable by means of a piston 46. The latter is attached to a piston plate 47 which, in turn, is rigidly secured in spaced relation behind the backing plate 44 similar to the spaced attachment of piston plate 37 to backing plate 34 of the upper shaping member 24. The piston 46 moves downward to bring the lower shaping member into a first or retracted position wherein its shaping plate 38 is below the common plane of the stub rolls 20. When the piston 46 moves upward, the shaping plate 38 moves above the common plane of the stub rolls 20 in the roller conveyor 10 and into a glass engaging position wherein the lower shaping plate 38 supports a glass sheet in pressurized engagement against the upper shaping plate 28.

In order to accomplish the vertical movement of the shaping plate 38 through the given plane occupied by the stub rolls 20 of the roller conveyor 10, a series of notches 50 are provided in the shaping plate 38. Each notch 50 in shaping plate 38 is aligned with a corresponding stub roll 20. Shaping plate 38 is spaced from its attached backing plate 44 a distance greater than the distance between its retracted position and its glass engaging position.

The lower shaping member 26 moves to the retracted position to permit glass sheets to enter and leave the shaping station 12. In its upper position, a deformable glass sheet at the shaping station is engaged between the upper and lower shaping members 24 and 26 to shape the glass into the shape desired.

The cooling zone 14 is a conventional cooling zone comprising upper elongated slot-type nozzles 52 and lower elongated slot-type nozzles 54 providing orifices from upper and lower plenum chambers 56 and 58. The orifices extend in vertical planes that intersect the path of glass movement. Cool fluid, such as air under pressure, is imparted into the plenum chambers 56 and 58 and leaves the chambers in the form of spaced parallel streams of air conforming in shape to the slot-type nozzles 52 and 54 to provide streams that quench the upper and lower surfaces of the glass sheets G as the latter are conveyed through the cooling zone by rotation of rolls 22.

The present invention combines a novel transfer carriage 60 with the prior art apparatus described hereinabove. In the illustrative embodiment of the present invention, the novel transfer carriage replaces a portion of a previously extending transfer section of a roller-type conveyor. However, the nature of the novel transfer carriage is such that it is capable of use in transferring bent glass sheets from a shaping station to a quenching station regardless of the nature of the conveyor used to transport a glass sheet into the shaping station and of the type of conveyor used to transport the glass through the quenching station.

nism with a conventional press bending operation is itemized in Table I.

TABLE I.—STEPS OF SHAPING AND TRANSFER CYCLE

| Step | Molds | Carriage— | Fingers | As seen in— |
|---|---|---|---|---|
| 1 | Retracted | At shaping station | Retracted | Figs. 4 and 8. |
| 2 | Engaging glass | do | do | Fig. 9. |
| 3 | do | do | Extended | Figs. 5 and 10. |
| 4 | Retracted | do | do | Figs. 6 and 11. |
| 5 | do | To quenching station | do | Figs. 7 and 12 (phantom). |
| 6 | do | At quenching station | Retracted | Figs. 7 and 12 (solid lines). |
| 7 | do | Returns to shaping station | do | Figs. 4 and 8. |

In plan, the transfer carriage is in the form of a U-shaped frame having a pair of longitudinal brackets 61 and 62 inter-connected at their leading edge by a cross-leg 63. The latter is disposed a sufficient distance above rolls 22 to furnish clearance for bent glass sheets conveyed thereunder. The rear of the carriage is open to permit clearance for moving the lower glass shaping member 26 vertically and the carriage 60 horizontally at the shaping station 14 without danger of collision therebetween.

The carriage 60 is provided with a plurality of wheels 64 which ride on tracks 65 and 66. Each wheel 64 rotates about a stub axle 67 supported between an outer wall 68 and an inner wall 69 comprising one or the other of the longitudinal brackets 61 or 62. The tracks extend lengthwise of the conveyor and are supported above the support structure for the conveyor system 10. It is understood that other devices such as rods in grooves and other well known mechanical equivalents may be substituted for the wheels and tracks to enable the carriage to move along the path of movement desired for the carriage.

A cylinder 70 with a piston rod 71 is located beyond track 65. The outer end of the piston rod 71 is attached to the cross leg 63 of the carriage 60 to control carriage movement. In addition, each bracket 61 and 62 supports a pair of additional cylinders 72. Fingers 74 are attached to the free ends of the piston rods 73 for each additional cylinder 72. The cylinder 70 is oriented to move its piston 71 parallel to track 65, while the additional cylinders 72 are oriented to move their fingers 74 in a direction normal to the track length. Any equivalent finger or carriage movement actuating mechanism such as a rack and pinion or driving gears or pulley and the like may be substituted for cylinders 70 and/or 72 as desired.

In a typical apparatus used for fabricating curved face plates for so called 25 inch television tubes of rectangular shape 20 inches long by 15 inches wide, an Alkon series D Model 49 cylinder having a 2½ inch bore and 30 inch stroke was used for the carriage transfer cylinder 70 and four Bimba Model 092–D air cylinders having a 1 1/16 inch bore and a 2 inch stroke were used for the finger actuating cylinders 72. Normally, the piston rods 71 and 73 are spring biased to one position and are actuated into another position by solenoid valves (not shown) that control the flow of air under pressure through air lines 75 and 76 which connect a pressurized air source (not shown) to the pistons 70 and 72, respectively.

The retractable fingers are preferably flat elongated fingers composed of a material such as Marinate, a trademark of the Johns-Mansville Corporation for a refractory material whose principal ingredients are silica, iron oxide, calcium oxide, alumina and magnesia, that does not mar glass at elevated temperatures, or a fiber glass covered metal or ceramic finger. Such materials are well known in the art and need not be described further herein.

The operation of the carriage and its fingers in synchro-

The illustrative embodiment of apparatus in the present invention works as follows. Glass sheets are placed in succession on the entrance of the roller conveyor 10 and are conveyed at a pre-determined speed along the furnace sections rolls 18. The glass sensing device comprising the photo tube detector 23d and a source of energy 23s disposed on opposite sides of the conveyor 10, detects the presence of the leading edge of a glass sheet G when the latter reaches the exit end of the furnace 11.

This detection actuates a timer circuit 80 (FIG. 1) which initiates rapid movement of the transfer section rolls 19 and the stub rolls 20 by actuating clutches 21 in such a manner that rolls 19 and 20 are driven by a high speed motor (not shown) in a well-known manner. The duration of this rapid movement is controlled by controlling the timer delay in a well-known manner so that the glass sheet comes to a stop in alignment between the upper shaping member 24 and the lower shaping member 26. At this stage, the latter is retracted and the carriage 60 is at the shaping station with its fingers 74 retracted to constitute step 1 of the cycle.

During step 1, the timer circuit 80 actuates the piston rod 46 for upward movement to raise the lower shaping member 26 from its recessed mold position disposed below the level of the conveyor 10 into a glass engaging position above the plane of the conveyor, thereby lifting the stopped glass sheet G off the stub rolls 20. The notches 50 in the lower shaping plate 38 of the lower shaping member 26 and the relatively large space between plates 38 and 47 compared to the distance lower shaping member 26 moves permit member 26 to lift the glass upward to pressurized engagement against the downwardly facing shaping surface 28 of the upper shaping member 24 to complete step 2 of the cycle. As an alternative, plate 47 may be notched with its notches aligned with those in plate 38 to permit the lower shaping member 26 to move an even greater distance between its retracted and glass engaging positions.

As the lower shaping member 26 moves above the plane occupied by the fingers 74, which have been retracted during steps 1 and 2, the fingers 74 are extended inward by timer circuit 80 to be immediately below the shaped glass and immediately above the stub rolls 20 of the conveyor 10. This constitutes step 3 of the cycle and places the fingers 74 below the notches 50. In step 4, the lower shaping member 26 is lowered to its retracted position while the fingers 74 are extended.

The bent glass sheet is deposited on the extended fingers as the lower shaping member 26 moves through the plane occupied by the fingers.

The carriage is then retracted to its second carriage position in the quenching station 14 by the timer circuit 80, actuating a solenoid valve that reverses the position of the piston rod 71. The fingers 74 remain extended to carry the bent glass sheet from the shaping station 12 to the quenching station 14 during step 5.

At the latter station, the finger actuating cylinders 72 are actuated to retract the fingers 74, thus depositing the glass sheet G on the rolls 22 of the quenching station section of the conveyor 10. This finger retraction is controlled through a common solenoid valve (not shown) that controls pressurized air in lines 75 to the pistons 72, and constitutes step 6. In step 7, the piston rod 71 is extended to transfer the carriage 60 back to the shaping station for another cycle with the fingers 74 and the lower shaping member retracted. A succeeding glass sheet enters the shaping stataion to repeat the cycle.

The foregoing apparatus described in this disclosure represents an illustrative preferred embodiment wherein all the movable elements are synchronized by control from a common timer circuit 80. It is also within the gist of the present invention to synchronize the movement of the conveyor rolls, shaping members, carriage and fingers by suitably located limit switches or other like devices that are actuated successively by the various moving elements in the apparatus. Such control systems per se are well known and readily available for adaptation for use in any cyclic system of operation.

It is understood that various changes may be made from the specific illustrative embodiment without departing from the spirit of the invention as defined in the claimed subject matter that follows.

What is claimed is:

1. Apparatus for transferring bent glass sheets from a shaping station to a quenching station along a path comprising:
   a transfer carriage,
   means operatively connected to said transfer carriage for moving said carriage between a first carriage position at said shaping station and a second carriage position at said quenching station in a direction of said path,
   said shaping station comprising a first shaping member located to one side of said path and a second shaping member movable between a retracted mold position on the other side of said path and a glass sheet engaging position on said one side of said path in a direction transverse to said path,
   said shaping members having complementary shaping surfaces conforming to the shape desired for the bent glass sheet,
   fingers on said carriage disposed between the plane of said path and said first shaping member,
   means for extending and retracting said fingers at an angle to said path and to said direction of movement for said movable shaping member, and
   notches on said movable shaping member in alignment with said fingers when extended in said first carriage position.

2. The apparatus according to claim 1, wherein:
   said fingers are constructed and arranged for movement in a horizontal plane,
   said first shaping member is disposed above said horizontal plane, and
   said movable shaping member is disposed for movement in a vertical path between a retracted position below said horizontal plane and a glass engaging position above said horizontal plane.

3. The apparatus according to claim 1, further including:
   a furnace, and
   a conveyor extending parallel to said path through said furnace, said shaping station and said quenching station in succession for transporting a succession of glass sheets therealong.

4. The apparatus according to claim 3, wherein:
   said conveyor comprises a series of longitudinally spaced rolls disposed in a common plane, and
   said notches are aligned with certain of said spaced rolls at said shaping station.

5. The apparatus according to claim 4, wherein said spaced rolls are disposed in a common horizontal plane, said fingers are disposed in a horizontal plane sufficiently above said common horizontal plane to accommodate for the curvature of bent glass sheets formed at said shaping station and said movable shaping member is movable in a vertical direction between a retracted position below said common horizontal plane and an elevated position above said horizontal plane occupied by said fingers.

6. The apparatus according to claim 5, further including horizontal track means extending longitudinally in flanking relation to said shaping station and said quenching station for guiding movement of said carriage between said first carriage position and said second carriage position.

7. The apparatus according to claim 6, wherein said horizontal track means comprises a pair of laterally spaced tracks extending longitudinally in parallel relation to said path on opposite sides of said path and said carriage comprises a pair of longitudinally extending brackets interconnected by a cross leg disposed sufficiently above said conveyor to furnish clearance for bent glass sheets to move under said cross leg along said conveyor and a pair of wheels carried by each of said longitudinally extending brackets for rotatable movement along each of said tracks.

References Cited

UNITED STATES PATENTS

| | | | |
|---|---|---|---|
| 2,570,309 | 10/1951 | Black | 65—273 X |
| 2,680,936 | 6/1954 | Grotefeld | 65—104 |
| 3,265,484 | 7/1966 | Ritter | 65—104 |
| 3,374,080 | 3/1968 | Wheeler | 65—273 |

S. LEON BASHORE, Primary Examiner

A. D. KELLOGG, Assistant Examiner

U.S. Cl. X.R.

65—104, 106, 275, 289